US005932626A

United States Patent [19]

Fong et al.

[11] Patent Number: 5,932,626

[45] Date of Patent: Aug. 3, 1999

[54] OPTICAL PRODUCT PREPARED FROM HIGH INDEX OF REFRACTION BROMINATED MONOMERS

[75] Inventors: Bettie C. Fong, Woodbury; David B. Olson, May Township, both of Minn.

[73] Assignee: Minnesota Mining and Manufacturing Company, St. Paul, Minn.

[21] Appl. No.: 08/853,998

[22] Filed: May 9, 1997

[51] Int. Cl.[6] .......... C08F 2/46

[52] U.S. Cl. .......... 522/182; 522/187; 522/188; 522/102; 351/159; 359/385; 526/292.3; 526/296; 428/176

[58] Field of Search .......... 522/188, 187, 522/182, 102; 351/159; 526/292.3, 296; 359/385; 428/176

[56] References Cited

U.S. PATENT DOCUMENTS

| | | | |
|---|---|---|---|
| 3,845,102 | 10/1974 | Higuchi et al. | 260/479 R |
| 4,542,449 | 9/1985 | Whitehead | 362/330 |
| 4,578,445 | 3/1986 | Sakagami et al. | 526/292.3 |
| 4,721,377 | 1/1988 | Fukuda et al. | 351/159 |
| 4,803,140 | 2/1989 | Hiro | 430/58 |
| 4,812,032 | 3/1989 | Fukuda et al. | 351/159 |
| 4,970,135 | 11/1990 | Kushi et al. | 430/280 |
| 5,175,030 | 12/1992 | Lu et al. | 428/30 |
| 5,183,597 | 2/1993 | Lu | 264/1.4 |
| 5,183,870 | 2/1993 | Fukushima et al. | 526/273 |
| 5,331,073 | 7/1994 | Weinschenk, III et al. | 526/265 |
| 5,359,021 | 10/1994 | Weinschenk, III et al. | 526/264 |
| 5,394,255 | 2/1995 | Yokota et al. | 359/49 |
| 5,424,339 | 6/1995 | Zanka et al. | 522/168 |
| 5,486,949 | 1/1996 | Schrenk et al. | 359/498 |
| 5,552,907 | 9/1996 | Yokota et al. | 359/49 |
| 5,591,527 | 1/1997 | Lu | 428/411.1 |
| 5,592,332 | 1/1997 | Nishio et al. | 359/619 |
| 5,598,280 | 1/1997 | Nishio et al. | 349/57 |

FOREIGN PATENT DOCUMENTS

| | | | |
|---|---|---|---|
| 0 267 459 | 5/1988 | European Pat. Off. | C08F 2/02 |
| 0 267 460 | 5/1988 | European Pat. Off. | C08F 220/22 |
| 40 10 783 | 10/1991 | Germany | C08F 220/30 |
| 61-286347 | 12/1986 | Japan | C07C 69/353 |
| 1-50689 | 10/1989 | Japan | C07C 69/54 |
| 3-23404 | 1/1991 | Japan | G02B 5/30 |
| 3-153715 | 7/1991 | Japan | C08F 220/14 |
| 4-285654 | 10/1992 | Japan | C08L 33/12 |
| 6-123856 | 5/1994 | Japan | G02C 7/00 |
| 6-86408 | 11/1994 | Japan | C07C 69/54 |
| 2 089 523 | 6/1982 | United Kingdom | G02B 1/40 |

OTHER PUBLICATIONS

English Language Abstract.

*Primary Examiner*—Duc Truong
*Attorney, Agent, or Firm*—Daniel C. Schulte

[57] ABSTRACT

Described are optical products comprising a base and an optical layer. The optical layer is prepared from a polymerizable composition comprising an alkyl-substituted brominated phenolic ester(meth)acrylate monomer.

39 Claims, 1 Drawing Sheet

OPTICAL PRODUCT PREPARED FROM HIGH INDEX OF REFRACTION BROMINATED MONOMERS

FIELD OF THE INVENTION

The invention relates to optical products, including high index of refraction optical products, for example brightness enhancement films. BACKGROUND Optical materials and optical products are useful to control the flow and intensity of light. Examples of useful optical products include optical lenses such as Fresnel lenses, optical light fibers, light tubes, optical films including totally internal reflecting films, retroreflective sheeting, and microreplicated products such as brightness enhancement films and security products. Examples of some of these products are described in U.S. Pat. Nos. 4,542,449, 5,175,030, 5,591,527, 5,394,255, among others.

Optical products can be prepared from high index of refraction materials, including monomers such as high index of refraction (meth)acrylate monomers, halogenated monomers, and other such high index of refraction monomers that are known in the optical product art. See, e.g., U.S. Pat. Nos. 4,568,445, 4,721,377, 4,812,032, and 5,424,339. The monomers can be cured or polymerized to take the form of a product capable of modifying or controlling the flow of light. In the particular structure of a microreplicated optical product, the monomers can be polymerized into a brightness enhancement film having a micro-fine prismatic pattern. See U.S. Pat. Nos. 5,175,030 and 5,183,597. Brightness enhancement films (BEFs) are very useful in many of today's electronic products to increase the brightness of backlit flat panel displays such as liquid crystal displays (LCDs), electroluminescent panels, laptop computer displays, word processors, desktop monitors, televisions, videocameras, and automotive and avionic displays, among others.

One important property of an optical material is its index of refraction, because index of refraction is related to how effectively an optical material can control the flow of light. There exists a continuing need for optical materials and optical products that exhibit a high index of refraction.

With respect specifically to brightness enhancement films, the index of refraction is related to the brightness gain or "gain" produced by the brightness enhancement film. Gain is a measure of the improvement in brightness of a display due to the brightness enhancement film, and is a property of the optical material (e.g., its index of refraction), and also of the geometry of the brightness enhancement film; as gain increases viewing angle will typically decrease. A high gain is desired for a brightness enhancement film because improved gain provides an effective increase in the brightness of a backlit display. Improved brightness means that the electronic product can operate more efficiently by using less power to light the display, thereby reducing power consumption, placing a lower heat load on its components, and extending the lifetime of the product. Thus, because of these advantages, there exists a continuing need to find optical products to provide improved levels of brightness gain, with even very small, seemingly incremental improvements being quite significant.

SUMMARY OF THE INVENTION

The present invention provides high index of refraction optical products comprising a base and an optical layer. The optical layer can be derived from a polymerizable composition comprising a high index of refraction, alkyl-substituted brominated phenolic ester (meth)acrylate monomer. In a preferred embodiment, the optical product can comprise a microstructure-bearing brightness enhancement film. The optical product can be placed in a backlit flat panel display to increase the brightness of the display, reduce power consumption, and lower heat load placed on the electrode, extending useful life of the product.

An aspect of the present invention relates to an optical product constructed of a base and an optical layer. The optical layer is prepared from ingredients including a brominated, alkyl-substituted phenolic ester (meth)acrylate monomer.

A further aspect of the invention relates to the above-described optical product, wherein the optical layer comprises a micro-structure bearing layer.

Yet a further aspect of the invention relates to a method of preparing a microreplication-bearing optical product. The method includes the steps of (a) preparing a polymerizable composition comprising an alkyl-substituted brominated phenolic ester (meth)acrylate monomer, the polymerizable composition preferably being liquid at room temperature; (b) depositing the polymerizable composition onto a master negative microstructured molding surface in an amount barely sufficient to fill the cavities of the master; (c) filling the cavities by moving a bead of the composition between a preformed base and the master, at least one of which is flexible; and (d) curing the composition.

The invention also provides backlit flat panel displays including liquid crystal displays (LCDs) comprising such articles and computers, televisions, and other products comprising such displays.

As used within the present description:

"Monomer" refers to a monomer on an individual scale, and also refers collectively to a composition of such monomers on a macroscopic scale such that the composition can be described as having a physical state of matter (e.g., liquid, solid, etc.) and physical properties (e.g., melting point, viscosity, glass transition temperature, and/or refractive index).

"Melting point," as used with respect to the monomer, refers to the temperature at which the monomer passes from a solid to a liquid state, as measured at atmospheric pressure. Melting point can be measured, for example, using a Thomas-Hoover Melting Point Apparatus, available from the Thomas Scientific of Swedesboro N.J.

"Index of refraction," or "refractive index," refers to the absolute refractive index of a material (e.g., a monomer) which is understood to be the ratio of the speed of electromagnetic radiation in free space to the speed of the radiation in that material, with the radiation being sodium yellow light at a wavelength of about 589.3 nm. Index of refraction can be measured using an Abbe refractometer, available commercially, for example, from Fisher Instruments of Pittsburgh Pa.

"(Meth)acrylate" refers to both acrylate and methacrylate compounds.

"Polymerizable composition" refers to a chemical composition that contains one or more polymerizable components as described in the present specification, including one or more of the identified monomers, oligomers, etc., and that can be cured or polymerized.

BRIEF DESCRIPTION OF THE DRAWING

FIG. 1 is not to scale and is intended to be merely illustrative and non-limiting.

DETAILED DESCRIPTION

Figure 1:
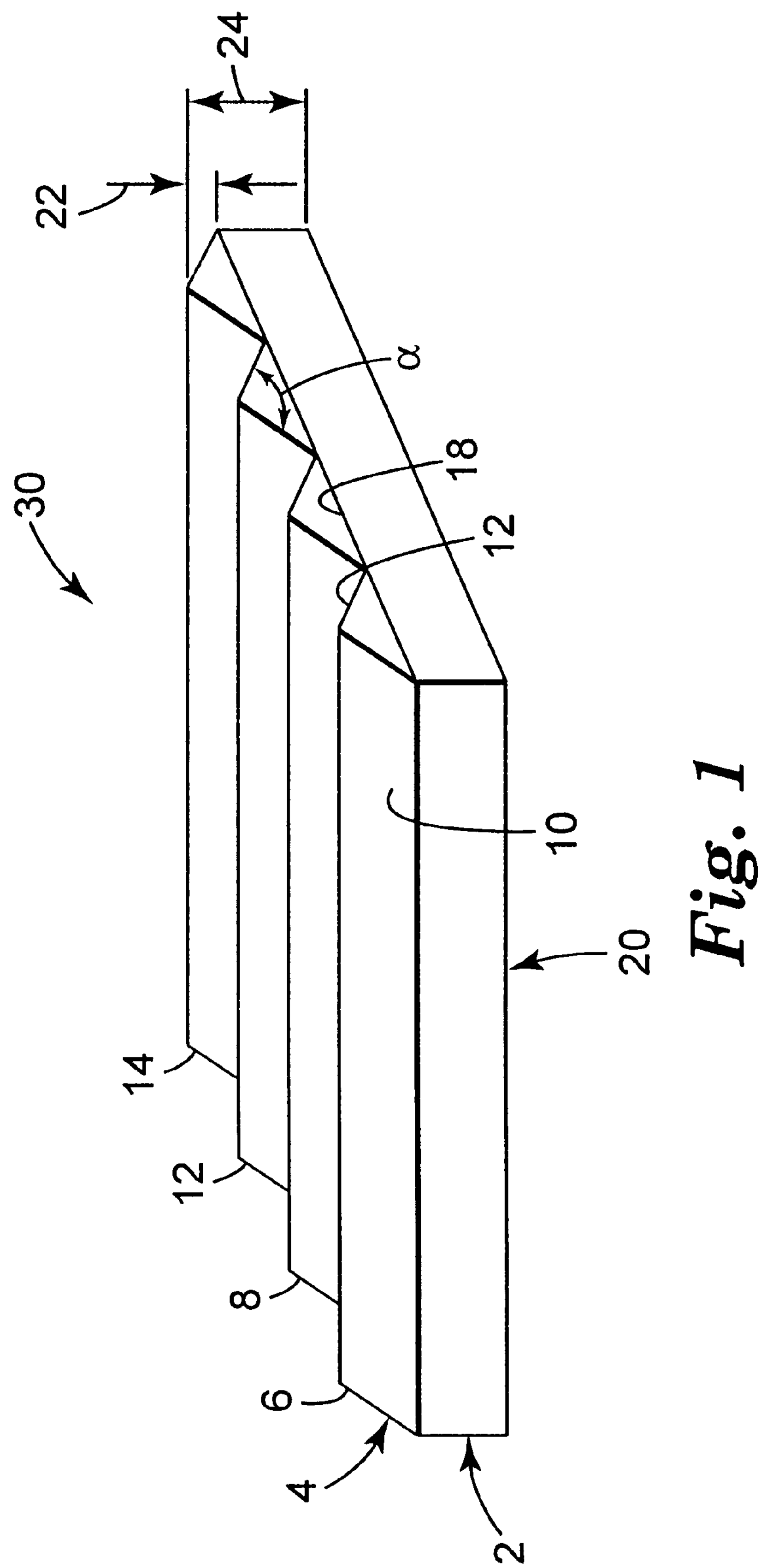
FIG. 1 is a perspective view of an illustrative microstructure-bearing optical product of the present invention.

The present invention describes an optical product constructed of a base layer and an optical layer. The base layer can be of a nature and composition suitable for use in an optical product; i.e., a product designed to control the flow of light. Almost any material can be used as the base material as long as the material is sufficiently optically clear and is of structural strength to be assembled into and used as or within a particular optical product. Preferably, a base material can be chosen to have sufficient resistance to temperature and aging that performance of the optical product is not unduly compromised over time.

The particular chemical composition and thickness of the base material for any optical product can depend on factors such as the requirements of the optical product that is being constructed, e.g., balancing the needs for strength, clarity, temperature resistance, surface energy, ability to adhere to the optical layer or another layer, etc. Useful base materials include cellulose acetate butyrate, cellulose acetate propionate, polyether sulfone, polymethyl methacrylate, polyurethane, polyester, polyvinyl chloride, syndiotactic polystyrene, polyethylene naphthalate (PEN), copolymers or blends based on naphthalene dicarboxylic acids (coPEN), and glass. Optionally, the base may contain mixtures or combinations of these materials; for example the base may be multi-layered, or may contain a dispersed phase suspended or dispersed in a continuous phase.

For some optical products, such as the preferred microstructure-bearing brightness enhancement film products described infra, examples of preferred base materials include polyethylene terephthalate (PET) and polycarbonate. Examples of useful polyethylene terephthalate base materials include: photograde polyethylene terephthalate; and MELINEX PET manufactured by ICI Films of Wilmington, Del.

Some preferred base materials can be optically active, and can act as polarizing materials. A number of bases (also referred to herein as films or substrates) are known in the optical product art to be useful as polarizing materials. Polarization of light through a film can be accomplished, for example, by the inclusion of dichroic polarizers in a film material which selectively absorbs passing light; by the inclusion of inorganic materials such as aligned mica chips; a discontinuous phase dispersed in a continuous film, such as droplets of light modulating liquid crystals dispersed within a continuous film; and by preparing a film from microfine layers of different materials. The polarizing material within the film can be aligned into a polarizing orientation, e.g., by methods such as stretching the film, the application of electric or magnetic fields, coating techniques, etc.

Examples of polarizing films include the polarizer films described in Assignee's copending United States Patent Application, having Attorney Docket Number 52008USA6A and application Ser. No. 08/610,092, and Assignee's copending United State Patent Application having Attorney Docket Number 52319USA7A and application Ser. No. 08/610,109, each filed on Feb. 29, 1996, and each being incorporated herein by reference. The use of these polarizer films in combination with a brightness enhancement film has been described in Applicants' copending U.S. patent application Ser. No. 08/807,262, having Attorney Docket Number 52008USA2C, filed on Feb. 28, 1997, and incorporated herein by reference.

A second example of a polarizing film that can be used as a base are those films described in Applicants' copending U.S. patent application Ser. No. 08/402,041, having Attorney Docket Number 49837USA1C, filed on Mar. 10, 1995, and incorporated herein by reference. One example of such films that are available commercially are those multilayer films sold under the trade designation DBEF (Dual Brightness Enhancement Film), from the 3M Company of St. Paul Minn. The use of such multilayer polarizing optical film in a brightness enhancement film has been described in Applicants' copending U.S. patent application Ser. No. 08/402,349, having Attorney Docket Number 49838USA8C, filed on Mar. 10, 1995, and incorporated herein by reference.

This list of base materials is not exclusive, and as will be appreciated to those skilled in the optical products art, other polarizing and non-polarizing films can also be useful as the base for the optical product of the invention. A short list of additional base materials could include those films described in U.S. Pat. Nos. 5,612,820 and 5,486,949 issued March, 1997, among others.

One or more of the surfaces of the base film can optionally be primed or treated to promote adhesion of the optical layer to the base.

The thickness of a particular base can also depend on the above-described requirements of the optical product. A thickness in the range from about 0.025 millimeters (mm) to 0.5 millimeters can be preferred, with a thickness in the range from about 0.075 millimeters to 0.175 millimeters being especially preferred.

The optical layer typically directly contacts the base layer, and can be of a size, shape, and thickness allowing the optical layer to direct or concentrate the flow of light. Thus, the optical layer can be a flat film, or the optical layer can bear a structured or microstructured surface that may be of any of a number of useful patterns, e.g., of a regular or irregular prismatic nature; of an annular prismatic nature, in the form of a cube-corner pattern; or any other lenticular microstructure. One preferred microstructure is a regular prismatic pattern that can act as a totally internal reflecting film for use as a brightness enhancement film.

The optical layer is prepared from a polymerizable composition comprising an alkyl-substituted brominated phenolic ester (meth)acrylate monomer. As used within the present description the term "polymerizable" refers to a chemical molecule such as a monomer or oligomer, etc., or, to a chemical composition, the molecule or composition being capable of curing, i.e., polymerizing or copolymerizing, for example, via unsaturated moieties, to produce a higher molecular weight material such as a polymer, prepolymer, or polymeric material. The terms "polymer," "polymerized material," and "polymeric material" are used interchangeably to refer to materials prepared from the reaction (i.e., polymerization or cure) of one or more unsaturated materials, e.g., one or more monomer, oligomer, polymer, or prepolymer, etc., and refers to, e.g., dimers, trimers, oligomers, prepolymers, copolymers, homopolymers, etc.

The alkyl-substituted brominated aromatic ester (meth) acrylate monomer (also referred to herein as "the Brominated Monomer," or "Brominated Monomer(s)") can preferably exhibit physical properties that allow a polymerizable composition containing such Brominated Monomer to be processed (e.g., blended, pumped, or otherwise handled prior to polymerization) at or near room temperature (e.g., in the range from about 20 to 25° C.) to produce a high index of refraction optical product. Thus, the Brominated Monomer can preferably have a relatively high index of refraction, e.g., 1.50 or more, preferably at least 1.55, and can preferably have a relatively low melting point. Examples of Brominated Monomers useful in producing the optical products of the present invention are described in Assignee's copending patent applications: "High Index of Refraction Monomers," having Attorney Docket Number 53247USA9A, and "Chemical Composition and Polymers and Polymeric Material Derived Therefrom," having Attorney Docket Number 53386USA5A, filed on even date herewith, and such disclosures being incorporated herein by reference. These Brominated Monomers can have the general formula:

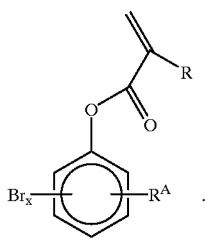

(1)

In formula 1, R can be hydrogen (—H) or methyl (—$CH_3$), $R^A$ can be a straight or branched alkyl, and x can be in the range from about 1 to 4, with the combination of these chosen variables preferably being chosen such that the Brominated Monomer has an index of refraction of at least 1.50. Most preferably $R^A$ can be a straight or branched alkyl having from about 1 to 18 carbon atoms. $R^A$ and each Br can be positioned either ortho meta, or para to the ester.

A particularly preferred class of Brominated Monomer are those comprising an aromatic portion substituted with an alkyl at the position ortho to the ester substituent:

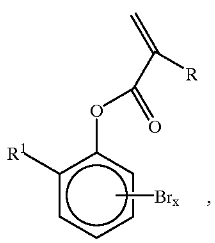

(2)

wherein R and x are defined above, and $R^1$ can be any alkyl sufficient to provide a Brominated Monomer having an index of refraction of at least 1.50. In a particularly preferred embodiment of this monomer, bromines are located at the 4 and 6 positions on the aromatic ring, ortho and para to the ester substituent:

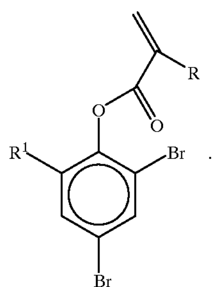

(3)

Particular monomers according to formula 3 include 4,6-dibromo-2-alkyl phenolic ester (meth)acrylates. Preferred of these are monomers wherein the alkyl ($R^1$) has from 3 to 4 carbons, such as the following:

4,6-dibromo-2-sec-butyl phenyl (meth)acrylate:

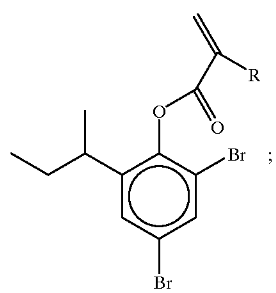

(3.1)

4,6-dibromo-2-tert-butyl phenyl (meth)acrylate:

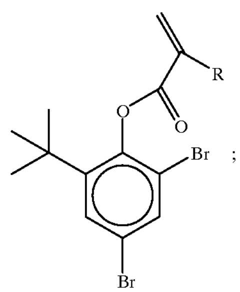

(3.2)

and, 4,6-dibromo-2-isopropyl phenyl (meth)acrylate:

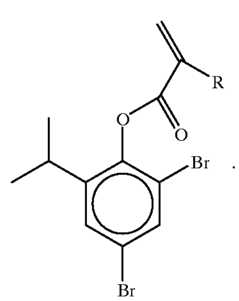

(3.3)

A second particularly preferred class of brominated monomer comprises an aromatic portion substituted with an alkyl group at the position para to the ester substituent:

(4)

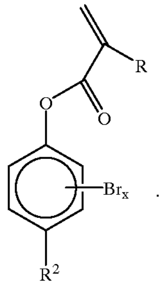

In FIG. 4, R and x are as defined with reference to FIG. 1, and $R^2$ is a straight or branched alkyl. Preferably, $R^2$ can be an alkyl group having from about 1 to 18 carbon atoms, more preferably from about 1 to 12 carbon atoms. Also preferably, the monomer can have at least two bromines attached directly to the aromatic ring. In a particularly preferred embodiment of this monomer, bromines are located at the 2 and 6 positions on the aromatic ring, each being ortho to the ester substituent:

(5)

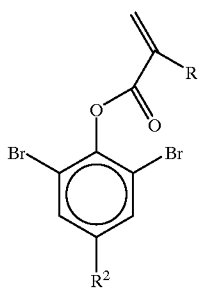

One particularly preferred para-substituted alkyl group is nonyl, giving dibrominated-4-nonyl phenyl (meth)acrylate monomers, such as 2,6-dibromo-4-nonyl phenyl (meth) acrylate:

(6)

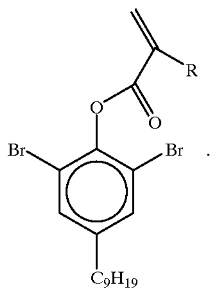

Another particularly preferred para-substituted alkyl group is dodecyl, giving dibrominated-4-dodecyl phenyl (meth)acrylate monomers, such as 2,6-dibromo-4-dodecyl phenyl (meth)acrylate:

(7)

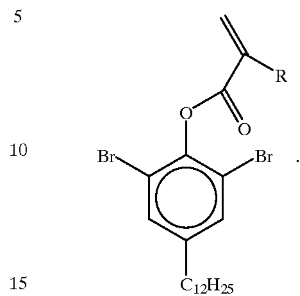

The Brominated Monomers can be prepared by any method generally useful in preparing brominated phenolic compounds, and in particular alkyl-substituted brominated phenolic ester (meth)acrylates. Such methods are well known in the chemical art. By one particular method, an alkyl-substituted phenol is brominated to produce a brominated alkylphenol. Alkylphenols are commercially available, among other sources, from Schenectady International, Inc., Chemical Division, Schenectady, N.Y. Such alkyl-substituted phenols can be brominated by methods that are generally known in the chemical art, and are described, for example, in the Kirk-Othmer Encyclopedia of Chemical Technology, volume 4, 543 ($4^{th}$ ed. 1992). An example of such a process with respect to an ortho-substituted alkyl phenol is as follows:

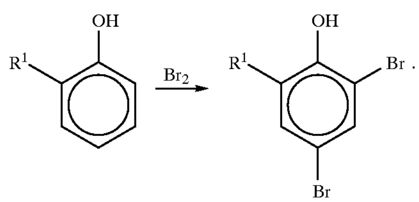

The brominated alkylphenol can be esterified to produce an alkyl-substituted brominated phenolic ester (meth) acrylate, by reaction with an appropriate acid chloride. The reaction between an alcohol and an acid chloride is well known in the chemical art, and is described, for example, in the Kirk-Othmer, Encyclopedia of Chemical Technology, volume 9, 769 ($4^{th}$ ed. 1992); see also U.S. Pat. No. 3,845,102. Inhibitors, such as phenothiazine or 4-methoxyphenol (MEHQ), can be used in such an amount to provide protection from pre-polymerization of the monomer during its synthesis and storage, while not excessively influencing the subsequent polymerization. With respect to the monomer of the present invention, a brominated alkylphenol can be reacted with a (meth)acryloyl chloride as shown:

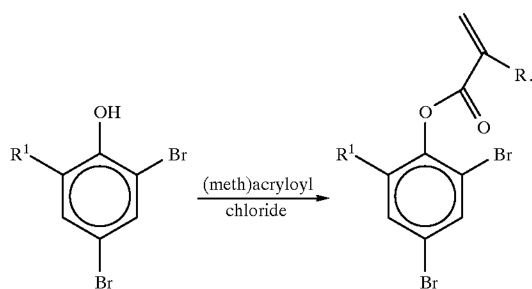

The Brominated Monomer can be used alone or in combination with one or more comonomers or high index of refraction comonomer(s) to prepare a polymerizable composition that can be processed to form a useful optical product. For purposes of this description, high index of refraction comonomer refers to any polymerizable material (e.g., monomer, oligomer, pre-polymer, copolymers and polymers, etc.) capable, in the presence of the brominated monomer, of being polymerized to produce a useful optical product. As will be apparent in light of the various examples below, the molecular weight of a high index of refraction comonomer can vary greatly. Preferred high index of refraction comonomers have an index of refraction of at least about 1.50.

The comonomer can comprise any of a number of known and useful polymerizable unsaturated moieties, e.g., vinyl, (meth)acrylate, N-vinyl, acrylic acid, methacrylic acid, allyl, acrylamide, acrylonitrile, etc. The comonomer can be mono- or multifunctional with respect to the unsaturated moiety, and where multifunctional, the unsaturated moieties need not be of identical chemistry.

One class of comonomer found to be useful in the polymerizable composition is the class of (meth)acrylate-functional monomers, preferably those having an index of refraction of at least about 1.50. Such (meth)acrylate functional comonomers can have a structure within the general formula:

(8)

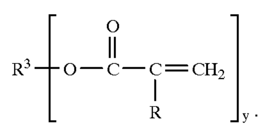

In formula 8, R can be hydrogen (—H) or methyl (—$CH_3$), y is preferably from about 1 to 6, and $R^3$ can be of any chemical structure that allows polymerization of the comonomer via the unsaturated moiety or moieties, and preferably provides a comonomer having an index of refraction of at least 1.50. Preferably, to achieve a sufficiently high index of refraction, $R^3$ can include one or more chemical moiety known in the optical product art to provide high optical activity, such as an aromatic moiety, cyclohexyl, a halogen such as chlorine, bromine, or iodine, or a sulfur-containing group. Further, however, the $R^3$ group can comprise one or more other chemical moieties or structures, for example oxyalkylene, urethane, epoxy, alkyl, allyl, etc., any of which can be straight, branched, cyclic, or unsaturated.

Examples of specific useful (meth)acrylate-functional comonomers include a number of mono-, and multi-functional (meth)acrylate monomers, including hexa-functional aromatic urethane acrylate oligomer available from UCB Radcure Inc., under the designation EB 220; 2-phenoxyethyl acrylate sold under the name Photomer 4035 by Henkel Corp., of Ambler Pa.; cyclohexyl chloroacrylate; benzyl acrylate; ethoxylated bisphenol A di(meth) acrylate; and oligomers such as modified epoxy acrylate, available from Sartomer under the trade designations CN120M50 and CN131, among others. These (meth) acrylate-functional comonomers are not brominated. However, particularly preferred polymerizable compositions of the present invention comprise the above-identified brominated monomer, and further comprise a brominated aromatic (meth)acrylate comonomer. Examples of such commercially available high index of refraction brominated monomers include brominated aromatic monomers such as 2-(2,4,6-tribromophenyl)-1-ethanol acrylic ester, sold as BR-31 (CAS #7347-19-5) by Dai-Ichi Kogyo Seiyaka Co. of Japan, and brominated epoxy diacrylate, manufactured by UCB Chemicals Corporation, Radcure, in Smyrna, Ga., under the designation RDX 51027. Still other brominated monomers that can be useful include tribromo phenyl acrylate, tetrabromobisphenol A diacrylate, ethoxylated tetrabromobisphenol A diacrylate, pentabromophenylacrylate, and tetrabromo xylyl diacrylate Another preferred high index of refraction comonomer is methyl styrene, having the formula:

(9)

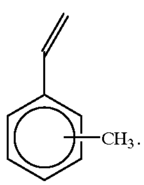

Methyl styrene exists and is useful in the polymerizable composition in any of various isomeric forms, including the ortho-, meta- and para- isomers. Methyl styrene is commercially available as a mixture of one or more of these isomers. For example, methyl styrene can be used and is commercially available in ratios of 80:20, 70:30, 60:40, 55:45, and 5:95 (meta:para):

(10)

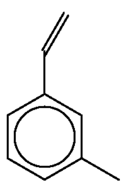

(11)

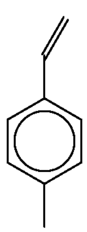

Methyl styrene is commercially available from Monomer-Polymer & Dajac Laboratory in Feasterville, Pa.

Alternatively, methyl styrene can be prepared by methods known in the chemical art; see the Encyclopedia of Polymer Science and Engineering, volume 16, p. 13, (2nd ed. 1985).

The particular Brominated Monomer and the particular high index of refraction comonomer or comonomers included in any given polymerizable composition, their molecular weight or molecular weights, and the amounts of each can be chosen according to factors such as the desired nature and properties of the polymerizable composition, and the desired properties of the optical product to be prepared therefrom (e.g., index of refraction, glass transition temperature, melting point, viscosity, etc.).

The amount of the Brominated Monomer present in the polymerizable composition can be any amount that will allow the production of an optical product having desired optical and mechanical properties. For example, while amounts outside of this range can also be useful, it can be preferred to use from about 5 to 50 parts by weight, more preferably from about 25 to 40 parts by weight of the brominated monomer, based on 100 parts by weight polymerizable composition.

Comonomer, e.g., high index of refraction comonomer, can also be present in the polymerizable composition in any useful amount. For instance, comonomer can be present in an amount in the range from about 50 to 95 parts by weight, more preferably from about 60 to 75 parts by weight based on 100 parts polymerizable composition.

The comonomer can comprise one or a combination of one or more comonomer or high index of refraction comonomer. For instance, the comonomer can comprise a mixture of one or more (meth)acrylate monomers (including mono-, and or multifunctional monomers). The comonomer can comprise this type of mixture further including methyl styrene monomer, or, the comonomer can comprise either of the above-described mixtures further including an aromatic (meth)acrylate monomer (e.g., a brominated aromatic (meth)acrylate monomer). In a particularly preferred embodiment, the polymerizable composition comprises from about 25 to 40 parts by weight of the Brominated Monomer, from about 5 to 15 parts by weight methyl styrene monomer, and from about 45 to 70 parts by weight of one or a combination of aromatic (meth)acrylate comonomers, such as, optionally and preferably, one or more aromatic brominated (meth)acrylate comonomers.

As stated above, the composition of the invention is polymerizable. Polymerization can be accomplished by usual means, such as by heating in the presence of a free-radical initiator, irradiation with electromagnetic radiation such as ultraviolet or visible light in the presence of suitable photoinitiators, and by electron beam. For reasons of convenience and production speed, the preferred method of polymerization is by irradiation with ultraviolet or visible light in the presence of photoinitiator. Examples of photoinitiators that are useful in the polymerizable composition include, but are not limited to those commercially available from Ciba Geigy of Tarrytown, N.Y. under the trade designations Darocur 1173, Darocur 4265, Irgacure 651, Irgacure 1800, Irgacure 369, Irgacure 1700, and Irgacure 184, and Irgacure 907. Photoinitiators containing phosphine oxide derivatives are preferred. A preferred photoinitiator is Lucirin® TPO, (2,4,6-trimethylbenzoy) diphenyl phosphine oxide, commercially available from BASF of Charlotte N.C. The photoinitiator can preferably be present in amounts in the range from 0.1–10 parts by weight per 100 parts by weight of polymerizable composition (pph).

The polymerizable composition can also contain one or more other useful ingredients that, as will be appreciated by those skilled in the polymer art, can be useful in such a polymerizable composition. For example, the radiation curable composition might contain a crosslinking agent, one or more surfactants, pigments, fillers, polymerization inhibitors, and other ingredients that can be useful within a polymerizable composition or within an optical product. Such ingredients can be included in the composition in amounts known to be effective for their respective purposes.

A crosslinking agent can be useful to increase the glass transition temperature of the polymer resulting from polymerizing the polymerizable composition. The glass transition temperature of a composition can be measured by methods known in the art, such as Differential Scanning Calorimetry (DSC), modulated DSC (MDSC), or Dynamic Mechanical Analysis (DMA). Illustrative examples of suitable crosslinking agents include diallyl phthalate, diallyl terephthalate, 1,3,5-tri-(2-(meth)acryloxyethyl)-s-triazine, and crosslinkers that are commercially available as, e.g., EB 220 (UCB-Radcure of Smyrna Ga.), Ebercryl 3603 (Acrylated epoxy novolac from UCB-Radcure), Ebercryl 693, CN112C60 (Sartomer), Ebercryl 6602 (trifunctional aromatic urethane acrylate). Preferably, the polymeric material will be crosslinked sufficiently to provide a glass transition temperature sufficiently high that the polymeric material is resistant to groove tip deformation. It is preferred that during polymerization of the composition, the temperature of the composition is maintained at a temperature that is equal to or slightly below the Tg of the polymerized composition (i.e., slightly below the midpoint Tg as determined by MDSC). The temperature of the polymerization during composition can be controlled by controlling the temperature of the polymerizable composition, the temperature of the master, or both.

Surfactants such as fluorosurfactants can be included in the polymerizable composition to reduce surface tension, improve wetting, allow smoother coating and fewer defects of the coating, etc. Specific examples of useful surfactants include nonionic fluorosurfactants sold by the 3M Company of St. Paul Minn. under the trade names FC-430, FC-171, and FC-740. Such surfactants can be included in the polymerizable composition in any useful amount, e.g., in an amount in the range from about 0.01 to 0.3 parts by weight per 100 parts polymerizable composition (pph).

Polymeric beads, inorganic fillers, and/or pigments can be added to the polymerizable composition in order to improve processing, to impart slip and scratch resistance to the polymerized material, or to affect optical properties of the polymerized material. Examples of useful polymeric beads include those made of polystyrene, polyacrylates, copolymers of styrene and acrylates, polyethylene, polypropylene, polytetrafluoroethylene, or combinations thereof Examples of inorganic fillers and pigments include solid or hollow glass beads, silica, zirconia, aluminum trihydroxide, and titanium dioxide. The mean particle size can be between 1 and 20 micrometer (um), and the particles can be included in the polymerizable composition in an amount in the range from about 0.25 to 7 weight percent, more preferably from about 0.25 to 2 weight percent.

The polymerizable composition can be used to prepare a variety of known and useful high index of refraction optical products or articles, for example optical lenses, optical films such as high index of refraction films e.g., microreplicated films such as totally internal reflecting films, or brightness enhancement films, flat films, multilayer films, retroreflective sheeting, optical light fibers or tubes, and others. The production of optical products from high index of refraction polymerizable compositions is described, for example, in U.S. Pat. No. 4,542,449, the disclosure of which is incorporated herein by reference.

A preferred optical product that can be prepared from the polymerizable composition is a microstructure-bearing article. Microstructure-bearing articles can be constructed in a variety of forms, including those having a series of alternating tips and grooves sufficient to produce a totally internal reflecting film (TIRF). An example of such a film is a brightness enhancement film having a regular repeating pattern of symmetrical tips and grooves. Other examples of groove patterns include patterns in which the tips and grooves are not symmetrical and in which the size, orientation, or distance between the tips and grooves is not uniform. Preferred examples of microstructure bearing articles useful as brightness enhancement films are described in Lu et al., U.S. Pat. No. 5,175,030, and Lu, U.S. Pat. No. 5,183,597, said descriptions being incorporated herein by reference.

According to the descriptions of Lu and Lu et al., a microstructure-bearing article can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master.

A preferred embodiment of an optical product of the invention is illustrated in FIG. 1, illustrating a microstructure-bearing brightness enhancement film. Referring to the Figure, brightness enhancement film 30 comprises base layer 2 and optical layer 4. Optical layer 4 comprises a linear array of regular right prisms, identified as prisms 6, 8, 12, and 14. Each prism, for example, prism 6, has a first facet 10 and a second facet 12. The prisms 6, 8, 12, and 14 are formed on base 2 that has a first surface 18 on which the prisms are formed and a second surface 20 that is substantially flat or planar and opposite first surface 18. By right prisms it is meant that the apex angle a is typically about 90°. However, this angle $\alpha$ can range from 70° to 120° and is preferably from 80° to 100°, and, it is not necessary that the corner be sharp, but it can be either sharp or rounded. The prism facets need not be identical, and the prisms may be tilted with respect to each other. The relationship between the total thickness 24 of the optical article, and the height 22 of the prisms, is not critical. Still, it is desirable to use relatively thinner optical layers with well defined prism facets. A typical ratio of prism height 22 to total thickness 24 is generally between $^{25}/_{125}$ and $^{2}/_{125}$.

A brightness enhancement film, as is known in the art, can typically be positioned in a display panel between a diffuser and a display panel lit by a light source, e.g., a backlit liquid crystal display. The brightness enhancement film controls the exit angle of the light emitted from the light source, and increases the brightness of the display panel. The increased brightness enables a sharper image to be produced by the display panel and allows the power of the light source to be reduced to produce a selected brightness. The brightness enhancement film in the backlit flat panel display is useful in equipment such as computers (e.g., laptop computers), televisions (e.g., personal televisions), video recorders, mobile communication devices, and automobile and avionic instrument displays.

The invention will be more fully appreciated with reference to the following non-limiting examples.

EXAMPLES

Preparation of 4,6-dibromo-2-sec-butyl phenol (DBsBP)

In an appropriately sized round bottom flask equipped with a mechanical stirrer, condenser, nitrogen cap, addition funnel, and temperature probe, 850 grams (g) of 2-sec-butylphenol was mixed with 5097 g of deionized water. The mixture was stirred with a mechanical mixer and purged with nitrogen for about 10 minutes. 1881 g bromine was added to the mixture drop-wise using the addition funnel. The reaction temperature was maintained at about 30° C. or less using an ice bath. following the addition of the bromine the reaction mixture was stirred for 30 minutes at room temperature. Reaction completion was determined by gas chromatography (GC) by monitoring the disappearance of the reactants and monobrominated species.

Upon completion of the reaction, 4487 g of ethyl acetate was added. The mixture was stirred for 15 minutes and then allowed to phase split. The bottom (aqueous) layer was removed and 750.5 g of a 13% (w/w) aqueous sodium hydrosulfite solution was added. The mixture was stirred well and then allowed to phase split. The bottom (aqueous) layer was removed and 856.4 g of a 13% (w/w) aqueous sodium chloride solution was added. The mixture was stirred well and then allowed to phase split. The bottom (aqueous) layer was removed and solvent was stripped from the top layer using a rotary evaporator.

The crude product was then distilled using a distillation head and vigeraux column. The product distills at 0.1 mm Hg, a pot temperature of 151° C. and a head temperature of 97° C. This procedure provided approximately 1500 g DBsBP.

Preparation of 4,6-dibromo-2-isopropyl phenol (DBiPP)

The procedure described for the preparation of DBsBP was followed using 800 g of 2-isopropylphenol instead of the 2-sec-butylphenol, 5291 g of water, 1953 g of bromine, 4658 g of ethyl acetate, 780 g of 13% (w/w) aqueous sodium hydrosulfite and 890 g of 13% (w/w) aqueous sodium chloride to produce 1598 g of DBiPP.

Synthesis of 4,6-dibromo-2-sec-butyl phenyl acrylate (DBsBPA)

In an appropriately sized round bottom flask equipped with a mechanical stirrer, condenser, addition funnel and temperature probe, 140 g of 4,6-dibromo-2-sec-butyl phenol, 360 g of t-butyl methyl ether, 55.2 g of triethyl amine, and 0.02 g phenothiazine were mixed. (In these examples, the base used was triethyl amine; however, a stoichiometrically equivalent amount of any other appropriate bases could also be used, such as sodium hydroxide or pyridine, among others). 47.3 g of acryloyl chloride was added drop wise and, using an ice bath, the reaction temperature was maintain below 20° C. The reaction was run to completion in approximately 30 minutes.

The product was then worked up by sequential washings with deionized water (257 g); 0.7% aqueous hydrochloric acid (51 g); 16% (w/w) aqueous sodium carbonate (59.6 g); and 8% (w/w) aqueous sodium chloride (54.5 g). Solvent was removed using a rotary evaporator and the crude product was vacuum distilled to yield 155 grams (94%) of product.

Synthesis of 4,6-dibromo-2-isopropyl phenyl acrylate (DBiPPA)

A procedure similar to that describe in the synthesis of DBsBPA was used to prepare 4,6-dibromo-2-isopropyl phenyl acrylate, however, 4,6-dibromo-2-isopropyl phenol was used in place of 4,6-dibromo-2-sec-butyl phenol.

Synthesis of 2,6-dibromo-4-nonyl phenyl acrylate (DBNPA)

In an appropriately sized round bottom flask equipped with a mechanical stirrer, condenser, nitrogen cap, addition funnel and temperature probe, 44 g of 4-nonylphenol and 180 g of deionized water were mixed. To this stirred mixture, 77.4 g of bromine was added dropwise being careful to keep the reaction temperature below 30° C. After the addition of the bromine, the mixture was allowed to react for about an hour. Once the reaction was complete, as determined by gas chromatography, the product was taken up into an organic phase of 160 g ethyl acetate. The organic phase was then washed with sequential washings of 13% (w/w) aqueous sodium hydrosulfite (26.5 g) and 13% (w/w) aqueous sodium chloride (30.2 g). The ethyl acetate was then stripped on a rotary evaporator and the crude product vacuum distilled using a short vigeraux column to yield approximately 66 g 2,6-dibromo-4-nonylphenol (DBNP).

In an appropriately sized round bottom flask equipped with a mechanical stirrer, condenser addition funnel, and temperature probe, 30.5 g of 2,6-dibromo-4-nonylphenol, 64 g of t-butyl methyl ether, 9.8 g of triethylamine, and 0.005 g of phenothiazine were mixed. To this stirred mixture, 8.4 g of acryloyl chloride was added over a period of 30 minutes being careful to keep the reaction temperature below 35° C. After the addition of the acryloyl chloride, the mixture was allowed to react at room temperature (approximately 25° C.) for a period of 2 hours at which point gas chromatography analysis indicated a complete conversion of the 2,6-dibromo-4-nonylphenol to 2,6-dibromo-4-nonyl phenyl acrylate (DBNPA). The product was then worked up with sequential washings of deionized water (45.6 g); 0.7% (w/w) aqueous hydrochloric acid (8.9 g); 16.4% (w/w) aqueous sodium carbonate (10.4 g) and 8.7% (w/w) aqueous sodium chloride (9.5 g). The organic layer was then dried over magnesium sulfate and the solvent stripped in vacuum to yield approximately 32 g of 2,6-dibromo-4-nonyl phenyl acrylate.

to the photopic brightness of the display without the BEF (backlight only).

$$\frac{\text{Photopic brightness with BEF}}{\text{Photopic brightness without BEF}}$$

The brightness of a Sharp backlight model C12 P display, powered by a Hewlett Packard E3611A DC power supply was measured with and without BEF using a Minolta Luminance Meter LS-100 Photometer. The BEF was placed on the backlight with the microfine prisms parallel to the long axis of the backlight, and facing the luminance meter. An acrylic frame was placed on top of the BEF to keep it flat against the backlight. After waiting for three minutes, the on-axis brightness of the display was measured in units of foot-lamberts. The BEF was then removed and the brightness was measured immediately afterwards. The ratio of these two readings was reported as the gain.

Examples 1–7 and Comparative Example 1 Preparation of Polymerizable Compositions Polymerizable compositions were prepared by blending ingredients in the amounts shown in Table 1. The values for the monomers/oligomers are the weight percent (wt %) of the component based on the total weight of the composition. The values for the surfactant, FC430, and initiator, TPO, are parts per hundred composition.

The general procedure which was followed in the preparation of these compositions included first charging into a single pot the RDX51027, PEA, and BR31 (comparative example 1) and then heating at 100° C. until melted, followed by mixing. The methyl styrene, (meth)acrylate monomers, and EB220 were then consecutively blended into the above mixture. The FC430 and TPO were then mixed in for at least 15 minutes. The mixture was then heated in an oven at 60–70° C. for 30 to 60 minutes.

TABLE 1

| | Compositions | | | | | | | | | |
|---|---|---|---|---|---|---|---|---|---|---|
| Example | DBiPPA | DBsBPA | DBNPA | Methyl Styrene | RDX 51027 | EB220 | BR31 | PEA | FC-430- (pph) | TPO (pph) |
| Comp. Ex. 1 | | | | | 30.0 | 20.0 | 37.5 | 12.5 | 0.3 | 1.0* |
| 1 | 15.0 | 11.0 | | 10.0 | 52.0 | 3.0 | | 9.0 | 0.3 | 3.0 |
| 2 | 25.0 | | | 10.0 | 55.0 | 5.5 | | 4.5 | 0.3 | 3.0 |
| 3 | | 25.0 | | 11.0 | 52.0 | 3.0 | | 9.0 | 0.3 | 3.0 |
| 4 | | | 25.0 | 11.0 | 52.0 | 3.0 | | 9.0 | 0.3 | 3.0 |
| 5 | | 25 | | | 50 | 3.0 | | 22 | 0.3 | 3.0 |
| 6 | 30 | | | | 48 | 3.0 | | 19 | 0.3 | 3.0 |
| 7 | | 20 | | | 50 | 3.0 | | 27 | 0.3 | 3.0 |

*In Comparative Example 1, 1.0 pph Darocur 1173 was used instead of 3.0 pph TPO.

Measurement of Refractive Index

The refractive index of resin compositions and cured films were measured using an Abbe Refractometer, made by Erma Inc., of Tokyo Japan, and distributed by Fisher Scientific.

Measurement of Viscosity

The viscosity of uncured resin compositions were made using a Brookfield Model LV viscometer set at 30 RPM and using a #3 spindle.

Measurement of Brightness Gain

The brightness gain or "gain" is the ratio of photopic brightness of a backlit display (e.g., a liquid crystal display or LCD) with a brightness enhancing film (BEF) compared Brightness Enhancement Films (BEFs) comprising a microstructured layer disposed on a substrate were prepared by placing the polymerizable composition between a PET substrate and a master with a micro-fine prismatic pattern. The prism angle was 90 degrees, and the prism pitch was 50 um (micrometer) (90/50). The compositions were spread by means of a knife coater to give a coating of 25 um thickness. The combination of PET substrate, polymerizable composition, and the master were heated to the temperature given in Table 2, and passed under a UV lamp (300 watts per square inch). The PET and cured composition were then separated from the tool, with the cured composition having the negative form of the prismatic structure replicated on it.

The composite film thus formed is referred to as brightness enhancement film, or BEF.

TABLE 2

Coating Conditions

| Example | Composition Temperature during polymerization | Conveyor Speed (ft/min) |
|---|---|---|
| Comp. Ex. 1 | | |
| 1 | 54° C. | 25 |
| 2 | 25° C. | 15 |
| 3 | 54° C. | 45 |
| 4 | 25° C. | 25 |
| 5 | 54° C. | 25 |
| 6 | 54° C. | 25 |
| 7 | 54° C. | 25 |

The compositions prepared according to Table 2 were found to have the physical properties outlined in Table 3 below.

TABLE 3

Physical Properties of Compositions and Films

| Example | Refractive Index | | Gain | Viscosity |
|---|---|---|---|---|
| | Unpolymerized | Cured Film | | (cps @ 23° C.) |
| Comp. Ex. 1 | 1.5592 | 1.5890 | 1.572 | solid |
| 1 | 1.5745 | 1.5975 | 1.607 | 2760 |
| 2 | 1.5755 | 1.5945 | 1.612 | 6400 |
| 3 | 1.5740 | 1.5936 | 1.610 | 2400 |
| 4 | 1.5675 | 1.5892 | 1.596 | 3800 |
| 5 | 1.5665 | 1.5919 | 1.597 | 7400 |
| 6 | 1.5685 | 1.5944 | 1.608 | 9200 |
| 7 | 1.5640 | 1.5912 | 1.608 | 4600 |

The data in Table 3 show that the compositions of the invention have a higher refractive index, a viscosity at room temperature that is suitable to processing and coating, and are capable of producing films having high levels of gain.

What is claimed is:

1. An optical product comprising:

a base; and an optical layer prepared from a polymerizable composition, the polymerizable composition comprising an alkyl-substituted brominated phenolic ester (meth)acrylate monomer of the general formula:

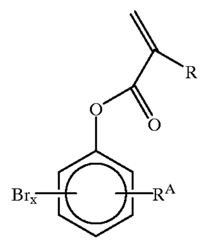

wherein x is from 1 to 4, R is —H or —$CH_3$, and $R^A$ is a straight or branched alkyl.

2. The optical product of claim 1, wherein the brominated monomer has an index of refraction of at least about 1.50.

3. The optical product of claim 1, wherein the brominated monomer has an index of refraction of at least about 1.55.

4. The optical product of claim 1, wherein the brominated monomer has the general formula:

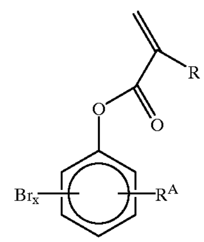

wherein x is from 1 to 4, R is —H or —$CH_3$, and $R^A$ is a straight or branched alkyl having from 1 to 18 carbon atoms.

5. The optical product of claim 4, wherein the brominated monomer has the general formula:

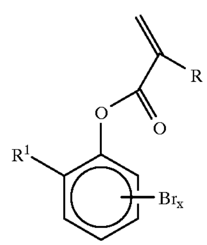

wherein R and x are as defined, and wherein $R^1$ is an alkyl having from 1 to 18 carbon atoms.

6. The optical product of claim 5, wherein $R^1$ is an alkyl having from about 3 to 4 carbon atoms.

7. The optical product of claim 5, wherein x is 2.

8. The optical product of claim 5, wherein the brominated monomer has the general formula:

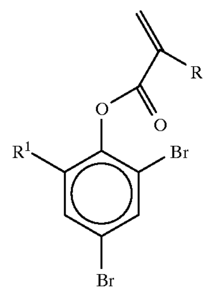

wherein $R^1$ is as defined.

9. The optical product of claim 8, wherein the brominated monomer comprises 4,6-dibromo-2-sec-butyl phenyl acrylate.

10. The optical product of claim 8, wherein the brominated monomer comprises 4,6-dibromo-2-tert-butyl phenyl acrylate.

11. The optical product of claim 8, wherein the brominated monomer comprises 4,6-dibromo-2-isopropyl phenyl acrylate.

12. The optical product of claim 4, wherein the brominated monomer has the general formula:

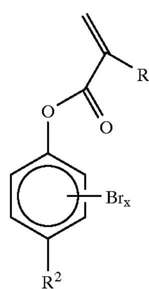

and wherein R and x are as defined, and $R^2$ is an alkyl having from about 1 to 18 carbons.

13. The optical product of claim 12, wherein $R^2$ is an alkyl having from about 8 to 12 carbons.

14. The optical product of claim 12, wherein x is 2.

15. The optical product of claim 12, wherein the brominated monomer has the formula:

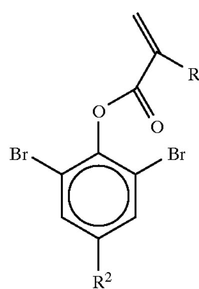

wherein $R^2$ is as defined.

16. The optical product of claim 15, wherein the brominated monomer has the formula:

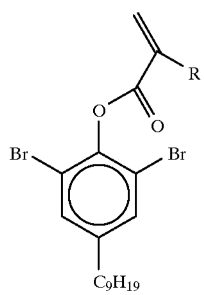

17. The optical product of claim 15, wherein the brominated monomer has the formula:

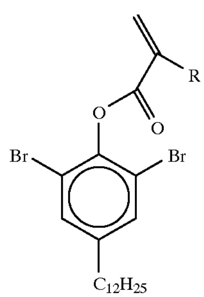

18. The optical product of claim 1, wherein the polymerizable composition further comprises a high index of refraction comonomer.

19. The optical product of claim 18, wherein the high index of refraction comonomer has an index of refraction of at least about 1.50.

20. The optical product of claim 18, wherein the high index of refraction comonomer comprises a (meth)acrylate monomer.

21. The optical product of claim 18, wherein the high index of refraction comonomer comprises an aromatic monomer.

22. The optical product of claim 18, wherein the high index of refraction comonomer comprises a brominated aromatic monomer.

23. The optical product of claim 18, wherein the high index of refraction comonomer comprises a brominated aromatic (meth)acrylate comonomer.

24. The optical product of claim 18, wherein the high index of refraction comonomer comprises methyl styrene.

25. The optical product of claim 1, wherein the polymerizable composition comprises from about 25 to 40 parts by weight of the brominated monomer; and from about 5 to 15 parts by weight methyl styrene monomer.

26. The optical product of claim 25, wherein the polymerizable composition further comprises from about 45 to 70 parts by weight aromatic (meth)acrylate monomer, such as brominated aromatic (meth)acrylate monomer.

27. The optical product of claim 1, wherein the composition is liquid at room temperature and atmospheric pressure.

28. The optical product of claim 1, wherein the index of refraction of the composition is at least about 1.56.

29. The optical product of claim 1 wherein the base is prepared from materials selected from the group consisting of cellulose acetate butyrate, cellulose acetate propionate, polyether sulfone, polymethyl methacrylate, polyurethane, polyester, polyvinyl chloride, syndiotactic polystyrene, polyethylene naphthalate, copolymers or blends based on naphthalene dicarboxylic acids, and glass.

30. The optical product of claim 29, wherein the base comprises a polarizer.

31. The optical product of claim 1, wherein the optical layer comprises a microstructure-bearing layer.

32. The optical product of claim 31, wherein the optical product comprises a brightness enhancement film.

33. A backlit flat panel display comprising the brightness enhancement film of claim 31.

34. A liquid crystal display comprising the backlit flat panel display of claim 33.

35. A computer or television comprising the liquid crystal display of claim 34.

36. A microstructure-bearing optical product comprising a base and an optical layer, the optical layer being prepared from a polymerizable composition comprising:

an alkyl-substituted brominated phenolic ester(meth) acrylate monomer;

methyl styrene monomer; and aromatic (meth)acrylate comonomer.

37. The microstructure-bearing optical product of claim 36, wherein the microstructure-bearing optical product produces a gain of at least 1.59.

38. A method of preparing a microreplication-bearing optical product, comprising the steps of preparing an polymerizable composition comprising an alkyl-substituted brominated phenolic ester(meth) acrylate monomer, the polymerizable composition being liquid at room temperature;

depositing the polymerizable composition onto a master negative microstructured molding surface in an amount barely sufficient to fill the cavities of the master;

filling the cavities by moving a bead of the composition between a preformed base and the master, at least one of which is flexible; and curing the composition.

39. A brightness enhancement film comprising a base; and an optical layer prepared from a polymerizable composition, the polymerizable composition comprising an alkyl-substituted brominated phenolic ester (meth)acrylate monomer of the general formula:

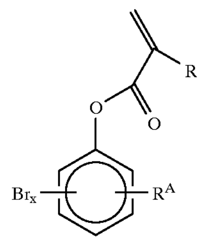

wherein x is from 1 to 4, R is —H or —$CH_3$, and $R^A$ is a straight or branched alkyl.

* * * * *